INVENTOR.
Gustav M. Waller,
BY Parker & Carter
Attorneys.

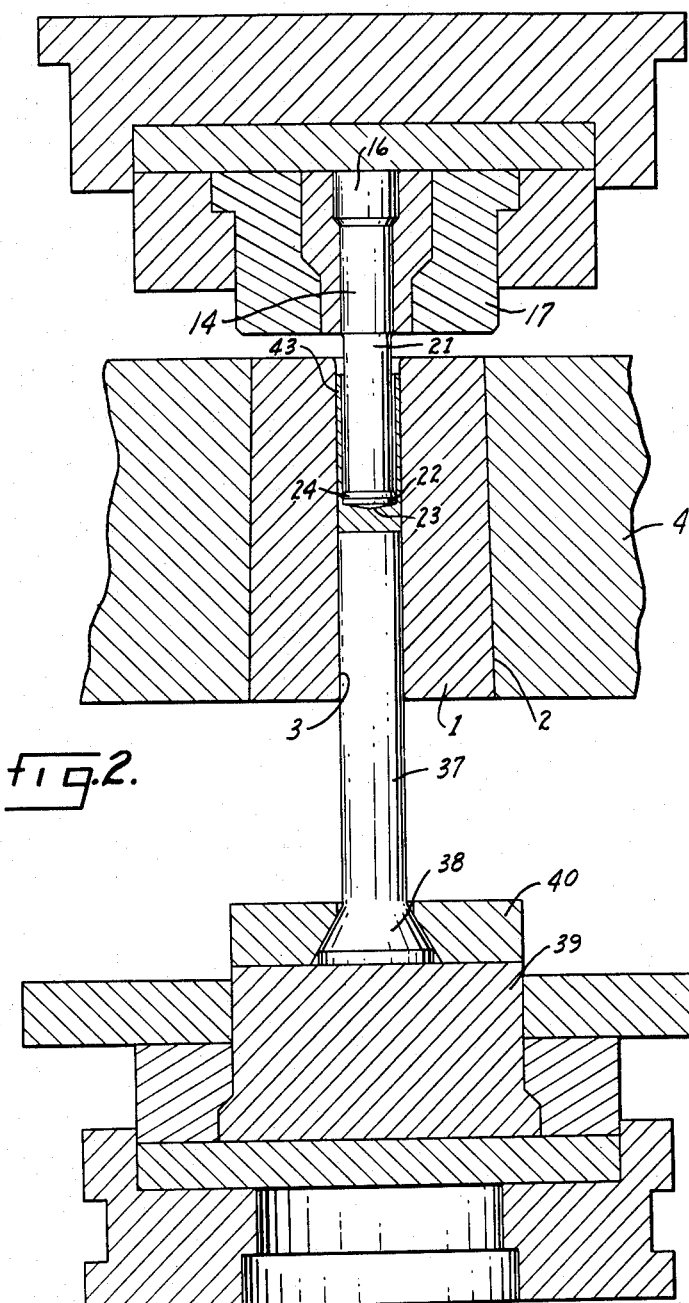

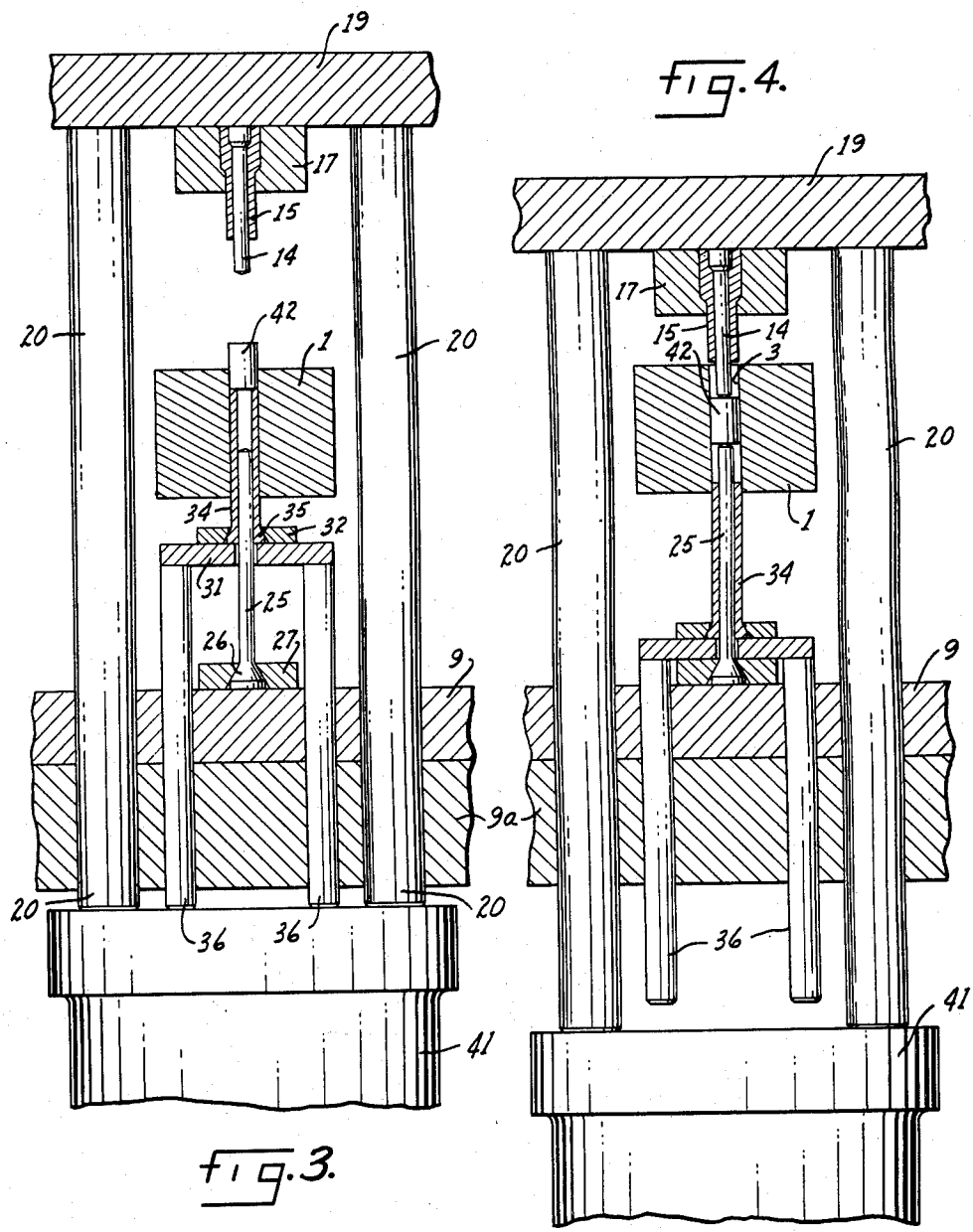

July 9, 1963 G. M. WALLER 3,096,579
PROCESS OF PRODUCING EXTRUDED ARTICLES
Original Filed April 15, 1959 6 Sheets-Sheet 4

INVENTOR.
Gustav M. Waller,
BY Parker & Carter
Attorneys.

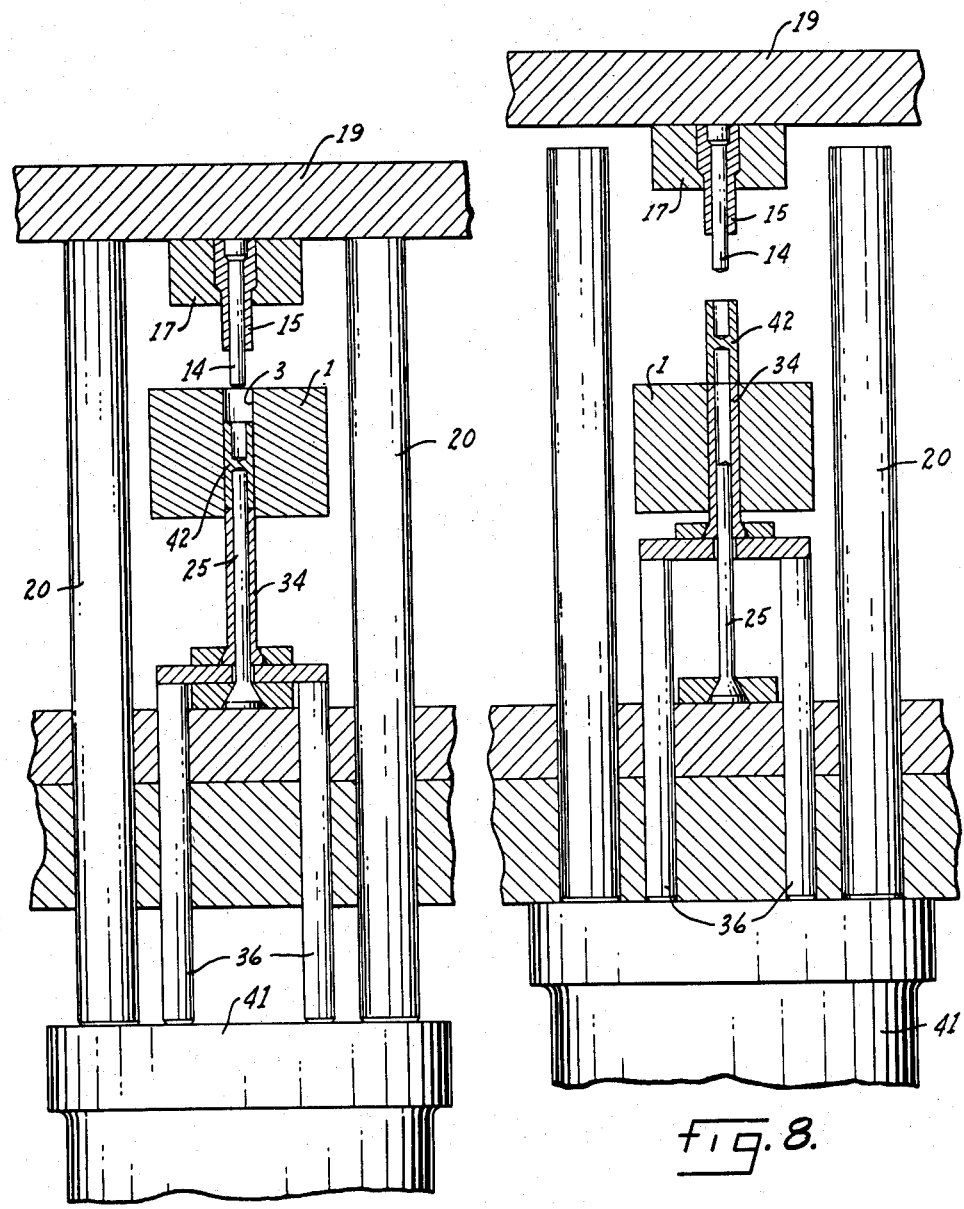

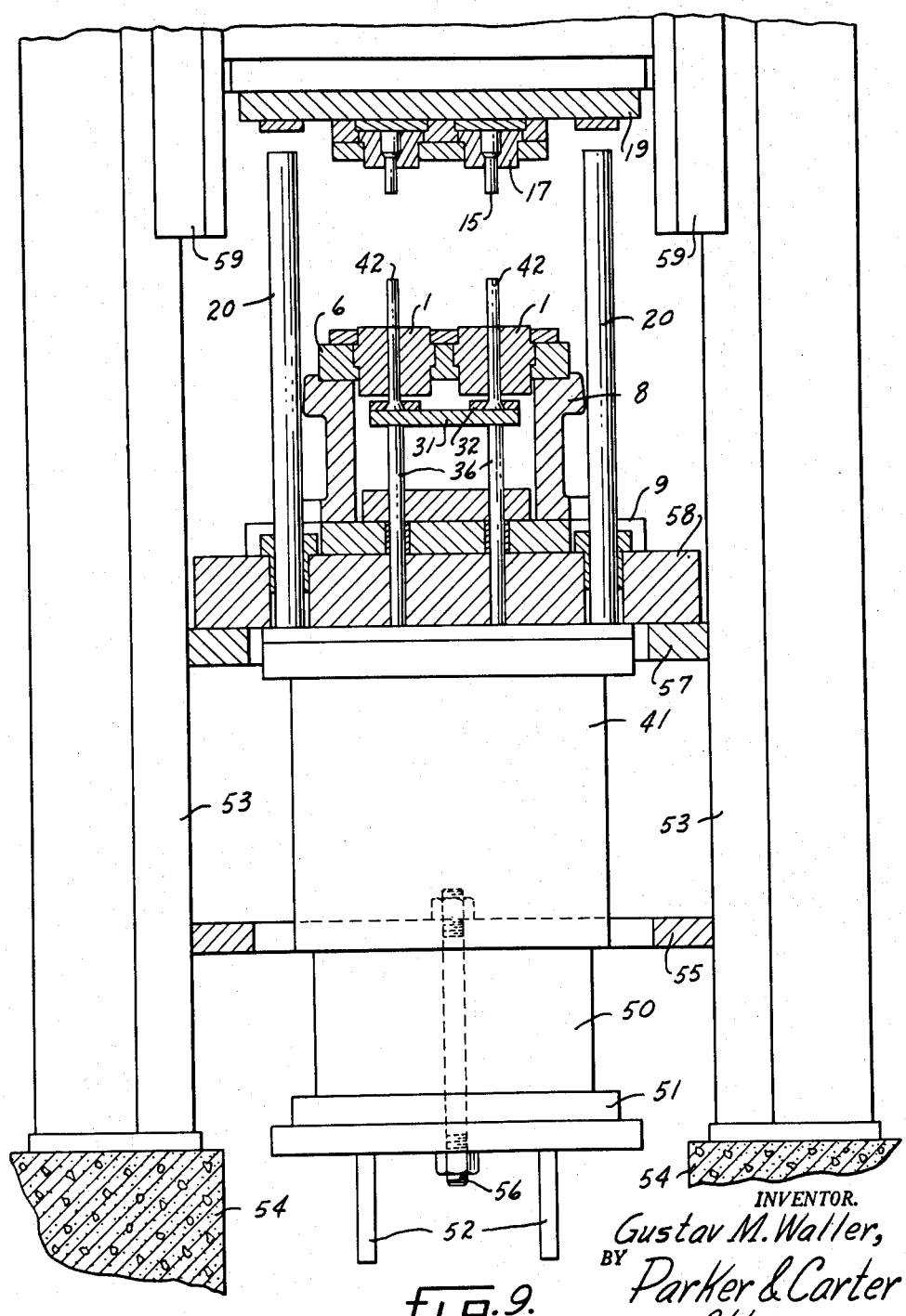

3,096,579
PROCESS OF PRODUCING EXTRUDED ARTICLES
Gustav M. Waller, Geneva, Ill., assignor to Burgess-Norton Mfg. Co., a corporation of Illinois
Original application Apr. 15, 1959, Ser. No. 806,534. Divided and this application Sept. 11, 1959, Ser. No. 843,610
2 Claims. (Cl. 29—534)

This invention relates to a method of extruding metal and it has for one object to provide a method of cold extruding metal to form accurately articles of a variety of shapes. This application is a division of co-pending application Serial No. 806,534, filed April 15, 1959, now abandoned.

Another object is to provide a method of cold extruding hard metal such as steel to produce accurately shaped and dimensioned hollow articles.

Other objects do appear from time to time in the specification and claims.

The invention is illustrated more or less diagrammatically in the accompanying drawings, wherein:

FIG. 2 is a vertical section with parts in elevation illustrating the parts at substantially the end of a single extrusion in which only a single die is used;

FIG. 3 is a diagrammatic showing of the structure and method of FIG. 1 with the parts in the position which they occupy at the beginning of an extrusion operation;

FIG. 4 is a view similar to FIG. 3 showing the parts when the punches are in contact with the metal which is to be extruded;

FIG. 7 is a view similar to FIGS. 3, 4, 5 and 6 illustrating the position of the parts when the upper punch has been withdrawn;

FIG. 8 illustrates the structure of FIG. 7 with the parts in the position they occupy when the piece part is completed and has been substantially ejected; and FIG. 9 shows a press frame in which is positioned a modified form of extrusion device having provisions for two simultaneous extrusion operations.

The structure as illustrated in FIGS. 1 and 3 to 8 comprises a single mechanism for carrying out a double backward extrusion, that is to say, for carrying out one extruded piece part at a time. It is obvious that the method which is to be described can be carried out in a multiple machine and that the mechanism for carrying out the method may comprise a multiple machine in which several sets of extrusion dies are associated as a part of a single machine and operate as a part of a single machine.

For purposes of simplicity, only a single die assembly is shown.

Figure 1:
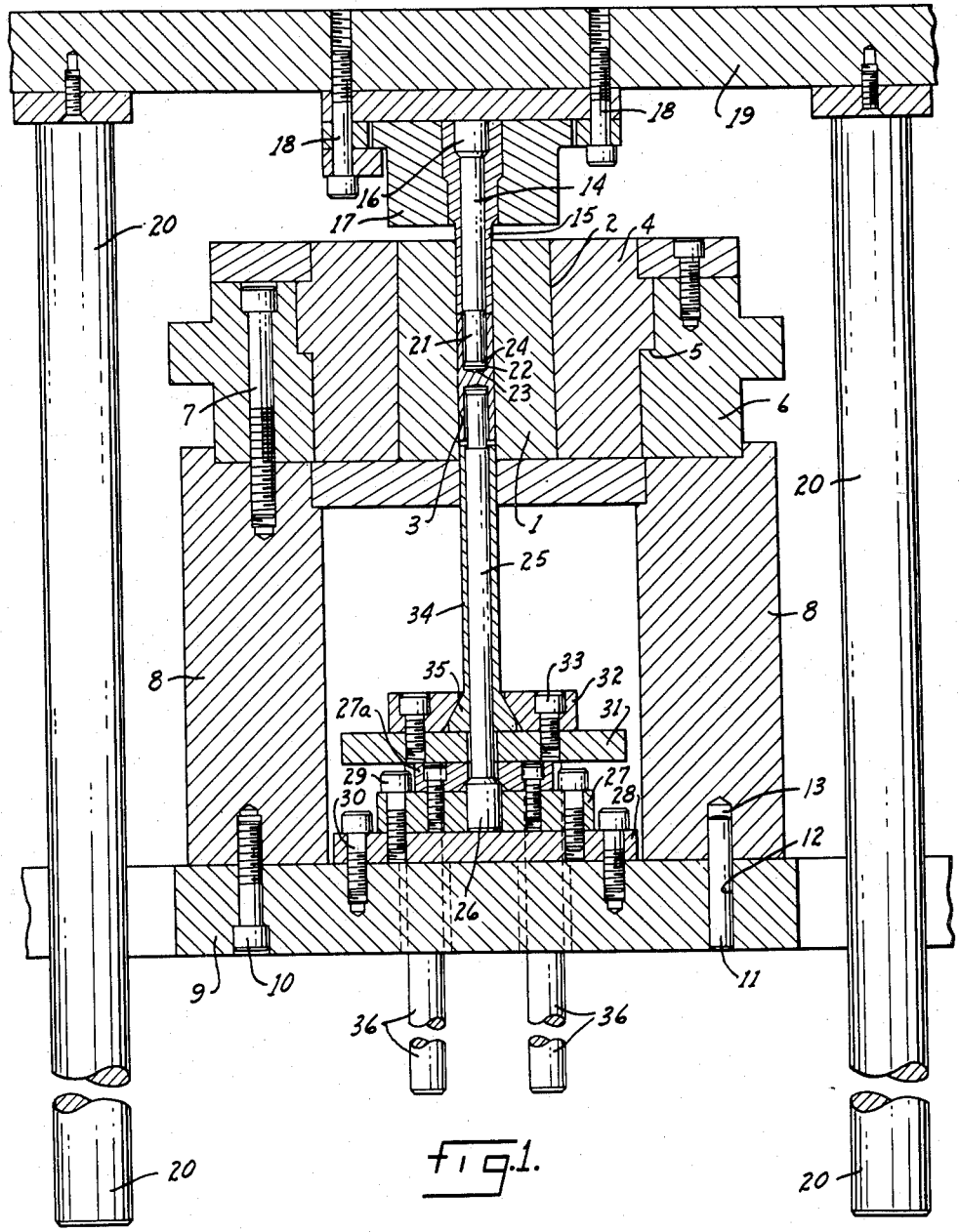
FIG. 1 is a generally vertical section with some parts in elevation illustrating one form of the device for carrying out the extrusion, the parts being in substantially the position which they occupy at the end of the extrusion process.

The article to be formed may be hollow and normally will be shaped to provide some enclosed space within itself. It may be shaped into any one of a variety of shapes. As shown in FIG. 1, the article which is being formed may be considered a bearing pin. Two punches cooperate and produce a generally hollow tubular member by double backward extrusion.

In the structure shown in FIG. 2 a single punch enters the metal and forms, by a single backward extrusion, a shell which has a solid or closed end and is generally tubular throughout the rest of its length.

The punch members as shown in the diagrammatic sequence embodied in FIGS. 3 to 8, inclusive, are simplified and the shape of the punch is simplified. Actually, the punch members will be throughout substantially as shown in detail in FIGS. 1 and 2.

The mechanism as shown includes a die part provided with a cavity. The metal to be formed is formed within this cavity, and the punch members, whether one or more than one are present, act upon the metal within the cavity in the die. The die is preferably tapered exteriorly so that it can be removably positioned within the carrying parts of the press in which the operation takes place. It may, however, also be straight walled.

The punch members are removable, and thus the mechanism may be altered by the substitution of different dies or punches in order to form articles of different shapes.

In the particular form of mechanism shown, 1 is a die shaped with an exteriorly tapered surface 2 and provided with an interior bore or perforation 3. It is held in a block 4 shaped as at 5 to engage a carrying member 6. This carrying member is fastened by screws 7 or otherwise to support 8, which is fastened to a die shoe 9 by screws 10 or otherwise. Positioning pins 11 may be used and, when used, enter perforations 12 and 13 formed respectively in the die shoe 9 and one or another of the supports 8.

To form the device shown in FIGS. 1 and 3 to 8, inclusive, two punches are used. There is an upper punch 14 positioned within a punch sleeve 15. The punch 14 is provided with an enlarged upper end or head 16 which fits within a correspondingly enlarged cavity in the sleeve 15.

The invention is not limited to any precise method of holding the upper punch in place. Actually, as shown, a punch block 17 engages the sleeve 15 and is held by screws 18, or otherwise, to the punch holder 19. The punch holder 19 abuts the cushion rods 20 which extend through suitable openings in the die shoe 9 and bolster plate, not shown, in FIG. 1.

The upper punch 14 is preferably reduced as at 21, and is provided with an enlarged head 22 which has a rounded or conical outer end face 23. The enlargement 22 is preferably connected to the reduced portion 21 by means of an inclined area or portion 24. As mentioned above, the shape of the end of the punches as shown in FIGS. 3 to 8, inclusive, has been simplified and the parts shown as though of constant diameter. They are, in fact, normally of the shape shown in FIGS. 1 and 2. Because of the relatively small scale of the punches as shown in FIGS. 3 to 8, inclusive, they have been simplified by the omission of the enlarged head.

As shown in FIG. 1, in which two punches are used, there is a lower punch 25 which is provided with an enlarged lower end 26 received in a locator or support 27. The locator is mounted upon a plate 28 and is secured to it by screws 29 or otherwise. The plate 28 is mounted upon the die shoe 9 and is secured to it by screws 30, or otherwise. Positioned above the locator 27 is a holding member 27A. Positioned above holding member 27A is an ejection rod holding ring 31 which carries ejector holding ring 32 secured to it by screws 33, or otherwise.

An ejection sleeve 34 is positioned outside of the lower punch 25 and is mounted for movement with relation to it. The sleeve 34 is enlarged as at 35, and is held in the member 32 and bears at its lower end upon the plate 31.

The plate 31 has secured to it the ejection rods 36 which may be moved to raise the plate 31, and thus to raise the ejection sleeve 34. By this means the ejection sleeve may have longitudinal movement in relation to the lower punch 25.

In the form shown in FIG. 2, only a single upper punch is used. This is substantially the same as the upper punch shown in FIG. 1 and the means of supporting it and moving it are the same as those shown in FIG. 1, and need not be redescribed.

In place of the lower punch and ejection sleeve of FIG. 1, the form of the device in FIG. 2 includes only an ejection punch 37. This punch fits closely within the bore 3 of the die 1 and is given reciprocation in it when required for ejection or for other reasons. The punch 37 is enlarged as at 38 and rests upon a block 39 being held by a ringlike member 40. The precise details of supporting the ejection punch 37 are not shown as they form no essential part of the invention. It is sufficient to state that the punch is supported in the mechanism shown in FIG. 2, and the parts similar to the ejection rods of FIG. 1 are provided to raise the member 37 when required to eject the formed piece from the die.

A sequence of operations from the start to the finish is shown in FIGS. 3 to 8, inclusive. These are diagrammatic showings and parts have been omitted for simplicity.

As shown in FIG. 3, a forming operation is to commence. Two punches are to be used and are present. There is thus an upper punch 14 within the upper punch sleeve 15, the two being seated within a block 17 which is secured to the punch holder 19. The punch holder 19 actuates the die cushion rods 20 which are in contact at their lower ends with a die cushion 41. Such a die cushion is present in the mechanism of FIGS. 1 and 2 in a complete machine. It has been omitted from FIGS. 1 and 2 to permit those drawings to be made on as large a scale as possible.

In the structure of FIG. 3 the die 1 is present. Its supporting details have been omitted for purposes of simplicity and showing. The lower punch 25, carried by the die shoe 9, is in position within the ejection sleeve 34 which is supported on the plate 31, to which the ejection rods 36 are connected. These rods, as shown in FIG. 3, contact the die cushion at suitable times in the cycle of operation of the mechanism.

In the starting position of FIG. 3 the parts just described above are in the positions shown and the ejection sleeve 34 has been lowered so that its upper end is a suitable distance below the top of die 1. A metal slug 42 is then inserted in die 1 cavity and is then consequently in place for forming.

The second step in the forming operation shown in FIG. 4; the die cushion 41 has been lowered and thus moved out of contact with the ejection rods 36. Lowering of the die cushion has lowered the parts which carry the ejection sleeve 34 and it has been withdrawn to its lowermost position. As this movement occurs, the lower punch 25 has not moved and thus its upper end has been uncovered by the movement of the ejection sleeve so that it projects. Correspondingly, metal slug 42 which originally rested upon the upper end of the ejection sleeve has been lowered until it rests upon the upper end of the lower punch 25. As this movement has taken place the punch holder 19 has descended and the upper punch 14 has entered the bore 3 of the die 1 and has been brought into contact with the upper surface of the metal slug or piece 42.

Figure 5:
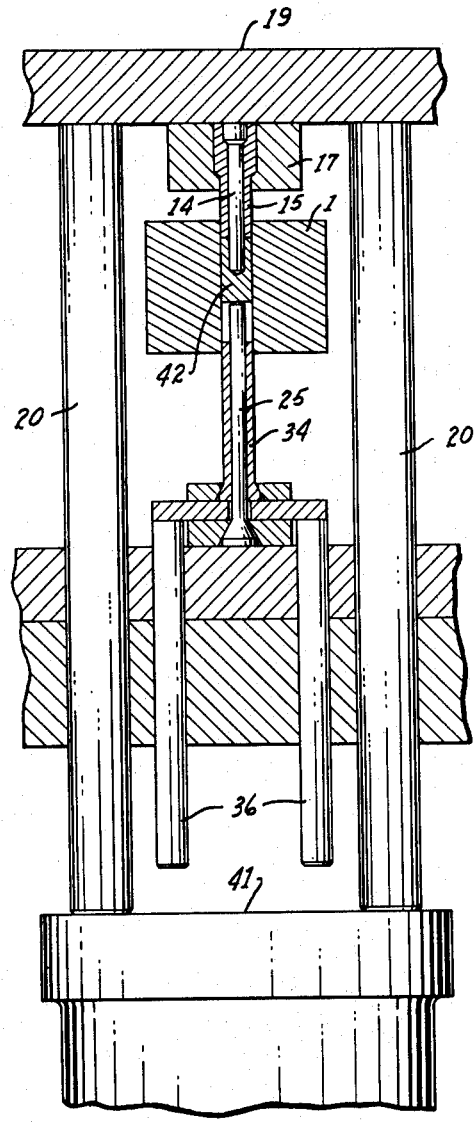
FIG. 5 illustrates the structure of FIG. 4 with the parts in the position which they occupy during half the extrusion process.

As shown in FIG. 5, the upper punch has been carried farther down into the bore of the die 1 and has been forced into the metal slug 42, causing upward flow of the metal so that its upper end has been made hollow or cup-shaped. Little or no penetration of the metal by the lower punch 25 has yet taken place. At this stage of the movement the partially extruded slug 42 is in contact with the lower end of the upper punch sleeve 15.

Figure 6:
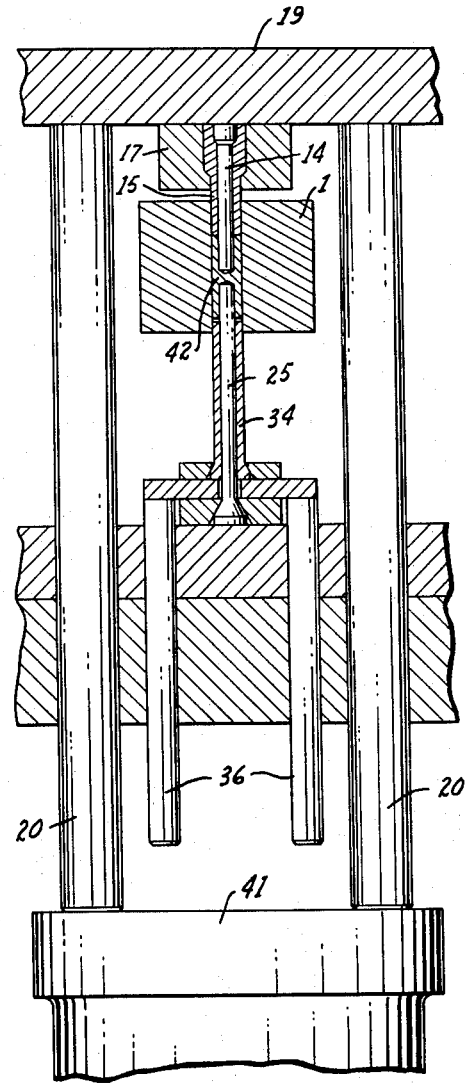
FIG. 6 illustrates the structure of FIG. 5 with the parts in the position which they occupy at the completion of the extruded part.

As shown in FIG. 6, the upper punch 14 has been carried downward beyond the position which it occupied in FIG. 5, and with it has come the punch sleeve 15. There has been no relative movement between this punch 14 and the sleeve 15 during this portion of their movement. The further downward movement of the punch 14 and the sleeve 15 toward the lower punch 25 and the ejection sleeve 34 about it has caused further flow of the metal of the slug 42. As shown in FIG. 6, the metal has been forced or flowed downwardly about the lower punch 25. The completion of its downward movement will cause the metal of the slug 42 to move in the direction of the upper end of the ejection sleeve 34. When this takes place the article is completed and at the final position of the extrusion operation the metal of the article 42 will normally be in contact with the lower end of the upper punch sleeve 15 and clear the upper end of the ejection sleeve 34. At the same time, the upper punch 14 will have approached its closed position with respect to the lower punch 25.

The forming operation has been completed when the parts are in the position of FIG. 6 and ejection is about to commence. In FIG. 7 the upper punch 14 has moved upward and withdrawn from piece part 42. The die cushion 41 has moved upward somewhat from the position of FIG. 6 so that it has contacted the ejection rods 36. During this movement the punch holder 19, which is bolted to the punch press ram, and the die cushion pins 20 are in contact and by this contact control the speed and travel of the die cushion and the ejection. As a result of this movement, as shown in FIG. 7, the upper punch 14 and the upper punch 15 have been moved and withdrawn completely from the cavity 3 of the die 1.

As shown in FIG. 8, the die cushion 41 has moved still farther upwardly. Through the upward movement of the press ram it has raised the punch holder 19 still higher than indicated in FIG. 7, allowing free movement of the die cushion 41. Through its contact with the ejection rods 36 the die cushion has forced the ejection sleeve 34 upwardly sufficiently to carry the now formed metal piece out of the die cavity 3 of the die 1. The lower punch 25 has remained stationary so that as the ejection sleeve 34 is raised it passes outwardly beyond the upper end of the lower punch 25 and thus the parts approach the condition of FIG. 3.

As the cycle continues after the completion of a piece and its ejection, as shown in FIG. 8, the die cushion 41 is lowered somewhat and with it the ejection rods 36 are lowered somewhat, thus carrying the ejection sleeve 34 toward, and finally to the starting position of FIG. 3. At this time another metal slug 42 is put in place, as shown in FIG. 3, and the cycle just described is recommenced. The cycle is carried out as often as desired to make as many pieces as desired.

The operation of forming a member such as that shown in FIG. 2 is substantially the same as that above described, except that after the forming operation has been completed, as shown in FIG. 2, the upper punch is withdrawn and the member 37 is forced upwardly to eject the finished piece 43. The ejection member 37 will be carried upwardly high enough through the bore 3 of the die 1 to eject the finished piece 43.

FIG. 9 shows the assembly of a modified form of the extrusion device in a suitable press framework. Frame members 53 may rest on a concrete foundation or floor 54 and have upper slide members 59 secured thereto. The slide members 59 position the press ram to which is fastened the punch holder 19 and the associated punch block 17 and operate as a track or guide means therefor in that the punch holder 19 moves on the slide members.

In this form of the invention, there are two extrusion devices and therefore there are two punch sleeves 15. The details of the punch sleeves and the punch are not shown in this figure as it to be understood that they would be the same as those described before.

The die shoe 9 upon which support 8 is seated is positioned and supported by bolster plate 58. The bolster plate in turn is placed and supported on the bed 57 of the press. The support 8 positions a carrying member 6 which contains two dies 1. Each of these dies is similar to that described before and provides means by which slugs 42 may be suitably extruded.

Positioned beneath the bed 57 is the die cushion 41 which, when actuated, bottoms on the bolster plate 58, thus governing its amount of upward stroke. The die cushion may be forced upward by means of air pressure in the die cushion air cylinder 50. This provides means for reciprocating the die cushion. The bottom 51 of the die cushion air cylinder is suitably secured by bolts 56 or the like to a bottom bed plate 55 which is secured to the press frame 53.

The operation of this device is similar to that described before in that air pressure in cylinder 50 forces the die cushion 41 upward, which in turn forces the cushion rods 20 and ejection rods 36 upward. The press ram moves the punch holder 19 and the associated sleeves 15 upward so that the extruded slugs 42 may be ejected. The press ram is allowed to travel a predetermined distance beyond center so the punch holder 19 engages cushion rods 20 allowing the ejection rods or punches 36 to move downward so that new slugs 42 may be positioned in the die.

Prior to placing the slug in the die, the slug should be coated with a suitable lubricant. The particular lubricant used will depend to a large extent on the metal being extruded. For example, in the case of sintered metal a colloidal graphite is included in the lubricant, whereas in the case of steel a zinc stearate or molybdenum disulphite can be used. The lubricant must be able to withstand the high pressures that occur in cold extruding such as shown herein and for that reason zinc stearate is preferred.

I claim:
1. A method of cold extruding metal blanks including the steps of confining the outer surface of the blank, applying axial pressure to one end of the confined blank with a punch smaller in cross section than the blank end while supporting the opposite end of the blank with a similar stationary punch whereby the blank extrudes axially along the first punch, limiting the extent of said extrusion, applying axial pressure externally concentric to and in the same direction as said first punch, whereby the opposite end of said blank extrudes axially along the stationary punch, limiting the extrusion in the second direction, and then ejecting the extruded blank from the zone of confinement while delaying the start of the next cycle a period of time consistent with the length of the finished slug in order to complete its ejection.

2. The method of claim 1 further characterized by and including the step of coating said blank with a lubricant prior to confinement.

References Cited in the file of this patent
UNITED STATES PATENTS

| | | |
|---|---|---|
| 1,756,416 | Woodhead | Apr. 29, 1930 |
| 2,183,637 | Biginelli | Dec. 19, 1939 |
| 2,395,721 | Buchet | Feb. 26, 1946 |
| 2,417,569 | Rice | Mar. 18, 1947 |
| 2,483,376 | Temple | Sept. 27, 1949 |
| 2,748,464 | Kaul | June 5, 1956 |
| 2,840,890 | Emm | July 1, 1958 |

FOREIGN PATENTS

| | | |
|---|---|---|
| 719,483 | Germany | Apr. 9, 1942 |
| 750,112 | Germany | Dec. 14, 1944 |

OTHER REFERENCES

"Cold Extrusion of Steel" by Lloyd and Kojsecki, from "The Iron Age," August 4, 1949, pp. 90–105.